United States Patent [19]

McWhorter

[11] 4,426,967
[45] Jan. 24, 1984

[54] ENGINE CHARGE AIR TEMPERATURE CLASSIFIER

[76] Inventor: Edward M. McWhorter, 6931 Greenbrook Cir., Citrus Heights, Calif. 95610

[21] Appl. No.: 414,395

[22] Filed: Sep. 2, 1982

Related U.S. Application Data

[63] Continuation-in-part of Ser. No. 160,577, Jun. 18, 1980, abandoned.

[51] Int. Cl.³ .................. F02M 15/00; F02M 31/02
[52] U.S. Cl. ........................ 123/315; 55/455; 123/547; 123/559
[58] Field of Search ............ 123/76, 315, 432, 433, 123/547, 559, 568; 55/455, 457, 459 R, 460, DIG. 28, 398

[56] References Cited

U.S. PATENT DOCUMENTS

| | | | |
|---|---|---|---|
| 1,839,420 | 1/1932 | Setz | 123/432 |
| 3,019,780 | 2/1962 | Nuding | 123/568 |
| 3,289,608 | 12/1966 | Laval, Jr. | 55/455 |
| 3,426,513 | 2/1969 | Bauer | 55/459 |
| 3,566,610 | 3/1971 | Fiore | 60/279 |
| 3,651,619 | 3/1972 | Miura | 55/460 |
| 3,688,476 | 9/1972 | Lenane | 55/337 |
| 3,969,096 | 7/1976 | Richard | 55/455 |
| 4,108,119 | 8/1978 | McWhorter | 123/315 |
| 4,162,663 | 7/1979 | Ehrlich | 123/432 |
| 4,248,199 | 2/1981 | McWhorter | 123/315 |
| 4,286,561 | 9/1981 | Tsutsumi | 123/432 |
| 4,312,313 | 1/1982 | McWhorter | 123/308 |

FOREIGN PATENT DOCUMENTS

| | | | |
|---|---|---|---|
| 55-54661 | 4/1980 | Japan | 123/432 |
| 1334472 | 10/1973 | United Kingdom | |
| 1424489 | 2/1976 | United Kingdom | 55/455 |

Primary Examiner—William A. Cuchlinski, Jr.

[57] ABSTRACT

The invention presents new and useful improvements in the method of designing air induction circuits for use in the intake manifolds of super-charged internal combustion engines. An air vortex generating chamber having a single air inlet conduit and two outlet conduits is placed between the compressed air source and the engine fuel atomizing device. The compressed air source entering the vortex chamber inlet is divided into two outlet streams, one hotter and one colder than the initial inlet stream. In the invention the vortex chamber functions as an air temperature management device which separates and classifies the air inducted into the engine in accordance with its heat content and distributes the separated streams to component areas of the intake manifold which are sensitive to temperature change. The warm air outlet, taken from the peripheral region of the vortex chamber, is used as a heat source and is directed above the point of fuel addition thereby increasing the effective vaporization of liquid fuel droplets. The colder outlet air stream, taken from the center of the vortex chamber, is used as a cooling media downstream of the point of fuel addition or at side ports in the engine cylinder, thereby decreasing the temperature in these areas. The addition of warm air improves the combustion efficiency by the reduction of fuel droplet size, while the addition of cool air at the other points in the manifolding increases the engine volumetric efficiency and also provides additional cooling for the piston crowns when applied at cylinder side ports.

9 Claims, 5 Drawing Figures

ENGINE CHARGE AIR TEMPERATURE CLASSIFIER

CROSS REFERENCE

This application is a continuation in part of my copending application Ser. No. 160,577 filed June 18, 1980, now abandoned.

BACKGROUND OF THE INVENTION

1. Field of the Invention

The invention relates to air-charge cooling and heating devices used in the induction circuits of internal combustion engines and more particularly to those types of engines which employ mechanically driven superchargers or hot gas driven turbochargers, hereinafter simply referred to as superchargers.

The invention serves the same purpose as those devices referred to in the art as "inner-coolers" or, "after-coolers", which are most prevelently used in the design of high performance engines. However, unlike the latter devices, cooling in the air temperature classifier hereinafter called the "classifier", is achieved entirely within the charge air stream by the principle of conservation of angular momentum and therefore does not require convective or conductive heat transfer to an outside cooling media.

The invention also relates to fuel heating devices used in aircraft engine carburetor de-icers necessary for high altitude flight and to automobile engine air preheaters necessary for the prevention of unburned hydrocarbon pollution during startup. In both applications combustion is improved through the reduction of fuel droplet size by vaporization which is more efficient at the higher temperatures.

Specifically the air temperature classifier makes use of those heating and cooling processes which operate on the established principle of sensible heat differences measured as temperature gradients within atomic, unimolecular, or homogeneous mixtures of gases rapidly moving in counterflowing vortices within a single chamber. These devices are commonly referred to in the art as "vortex coolers", or "vortex heaters", depending on the manner of their application.

The invention operates on the principle of conservation of angular momentum and though similar in appearance should not be referenced to gas-solid or gas-liquid cyclone separators which are used to affect a separation of material of different physical state based on the principle of centrifugal mass distribution within a single outer vortex which is a completely different principle of operation.

2. Description of Prior Art

The principle of the "hot-cold" tube as it is often referred to, or the "Maxwell demon", named after its discoverer, has been studied since the middle of the nineteenth century. More recent studies by Ranque in France in the early 1930's and even more recently by Hilsch in Germany in the mid 1940's have brought the design to a point of practical application. However, the specific principle has never been applied to engine induction and exhaust processes except as a means of centrifugal separation of material substances of different physical state.

The manner of generating the vortex flow in the invention presented is different from all other known designs. In all previous designs of vortex temperature generating equipment, the inlet flow to the chamber has been introduced tangentially to the cylindrical surface in a direction which is perpendicular to the longitudinal axis of the chamber. The flow of the vortex toward the opposite end of the chamber is therefore caused by pressure differences between the inlet and outlet of this type of design construction. In the design presented the inlet flow is also introduced tangentially to the cylindrical surface but unlike previous devices the flow is directed in a more or less axial direction relative to the longitudinal axis of the chamber. This is done primarily to overcome the marginal discharge pressure conditions of most supercharger compressors relative to their ability to produce the pressure and velocity requirements within the vortex chamber necessary to generate a sensible temperature difference between the two outlet streams. By introducing the flow axially to the chamber and inlet manifold, and causing it to swirl while it moves in this direction, increases the velocity head at the inlet of the vortex generating orifices providing axial stream momentum to the vortex within the chamber causing it to more rapidly traverse the length of the chamber rather than depending on pressure differences alone as is the case of all other vortex equipment. This increases the relative velocity between the inner and outer counterflowing vortices formed by this type of equipment and thereby decreases the equilibruim heat transfer across the interface by shortening the period of contact thereby increasing the sensible heat difference between each vortex stream exiting the chamber. In the automotive engine applications, vortex phenomena was first applid by Bauer in 1965 in his U.S. Pat. No. 3,426,513, "Vehicular Vortex Cyclone Type Air and Gas Purifying Device", and in 1968 by Fiore in his U.S. Pat. No. 3,566,610, "Method and Apparatus For Separating Fluids". In both of these previous applications the principle of operation depends on the relationship between the curvilinear acceleration and the resulting radial mass distribution of solid impurities within the vortices, which are used as separator devices rather than temperature classifiers as claimed in the present invention.

Unlike previous vortex applications in the engine field, the present invention is not used as a centrifugal separator for cleaning the induction air or to rid the exhaust gas stream of solid particulate matter. Air entering the induction manifold of the temperature classifier is presumed to be first filtered through a porous or fibrous media or by other methods commonly in use. It should also be noted that the invention presented in its present form is not intended or suitable for application in the engine exhaust stream.

The invention is designed for use in the induction manifolds of super-charged internal combustion engines as a temperature management device. Management of the inlet temperature provides a means of controlling preignition in gasoline engines and can also be used to extend the lean limit operating range of most engines. Combustion and volumetric efficiencies can also be improved by systematic classification and management of the inlet stream temperature.

Engines which run on gasoline and employ electrical spark or other types of electrically timed ignition are sensitive to air charge temperature because of both preignition and detonation limits. In this regard the octane requirements for an engine operating at a given compression ratio can be substantially reduced by the air temperature classifier by cooling the charge entering the chamber. Anomalies originating in the combustion chamber, such as the tendency to develope hot spots on clearance surfaces, which ignite the charge before electrically induced ignition are also reduced by cooling the air.

The air temperature classifier can also be used to improve the performance of engines by cooling the charging air. The cooler air charge entering the engine permits a larger induction by weight which significantly increases the volumetric efficiency. Cooling in this manner can produce 5 to 10 percent more power at the same speed as the uncooled system operating at a higher manifold pressure.

Looking now at the method of applying the warm air outlet of the classifier for improving the combustion efficiency and extending the lean operating limits of the engine. The lean limit operating range of the engine can be extended by improving fuel-air distribution within the intake manifold adjacent to the engine inlet. Improved air fuel distribution is best achieved by the use of fuel atomizing devices that will produce droplet sizes approaching 10 to 30 microns. This type of operation is most easily achieved by diverting the hot air stream from the air temperature classifier to the atomizer such that vaporization further reduces the size of the atomized droplets. Previous investigators have used the elevated temperature of the exhaust manifold or water jacket of the engine for this purpose while others have used electrical heating devices. Because vaporization is a cooling process the fuel-air charge leaving the fuel atomizing zone is slightly cooler than the charge air from the classifier entering the zone. The fuel-air mixture is reunited with the cold air component of the classifier at a point downstream of the atomizing zone. Maintaining the fuel-air charge mixture above the system dew point is achieved by controlling the fuel-air mixture ratio above the corresponding saturation point at the engine inlet temperature.

Operating the engine under lean limit conditions results in worthwhile reduction of exhaust emissions and very significantly reduces the fuel consumption rate.

The air temperature classifier, as is the case of most vortex chambers, is a simple flow device capable of separating compressed gaseous fluids into two outlet streams of different temperature. The temperature difference between the outlet streams increases with inlet velocity, which for best results should be sonic. This is achieved by increasing the discharge pressure from the supercharger compressor to a value approximately 2½ times the internal pressure of the classifier chamber which is maintained at about 16 to 17 pounds of absolute pressure at the engine maximum load conditions. Inlet pressures of this magnitude can be supplied by most supercharger compressors at slightly above midrange operation. At lower boost pressures, during partial load operation of the engine, the backpressure on the classifier exit orifices (outlets) are reduced by throttling the amount of air entering the inlet of the classifier, thus maintaining the uninterrupted sonic flow to the classifer for longer periods of time.

As an alternate application of the invention, the classifier air stream may be directed to side-ports in the engine cylinder and thereby supply cooling air to the piston crowns. The cool air stream would be supplied to manifolding similar to that taught by the McWhorter U.S. Pat. Nos. 4,108,119, 4,248,199 and 4,312,313. Operation in this manner decreases the temperature of air entering the engine cylinder at this point and thereby provides more effective cooling of the piston crowns and is by its nature more specifically applicable to those systems which utilize stratified charging techniques.

SUMMARY OF THE INVENTION

It is the primary object of the invention to employ a vortex chamber as a means of dividing a filtered compressed air source, inducted into an internal combustion engine intake manifold, into two separately flowing streams of different temperature.

Another object of the invention is to provide a method of promoting engine fuel droplet vaporization for faster and more efficient combustion using the warm air stream of a vortex chamber as a means.

Another object of the invention is to provide a method of improving the volumetric efficiency of engines by increasing the amount of air entering the engine inlet using the cool air stream of a vortex chamber as a means.

It is yet another object of the invention to provide a method for more efficiently cooling the engine clearance by using the cool air stream of a vortex chamber and thus decrease the incidence of preignition and detonation and thereby facilitate the use of lower octane fuels.

It is still another object of the invention to provide additional cooling for piston crowns of engines which employ cylinder sideports by ducting the cool air stream of a vortex chamber to the inlet of the bottom cycle manifolding used on such engines.

Another object of the invention is to provide cool air to cylinder sideports of engines which employ stratified charging methods by ducting the cool air stream of a vortex chamber to the inlet of bottom cycle manifolding used on such engines.

And still another object of the invention is to improve the boost response of turbochargers by continuously supplying air to the turbine in amounts diametrically proportional to the engine load by ducting the air stream of the vortex chamber to the inlet of the turbine manifold.

All of the foregoing and further objects and advantages of the invention will become apparent from the study of the drawings and detailed descriptions herein provided.

BRIEF DESCRIPTION OF THE DRAWINGS

There are presented as part of the specification, drawings showing the major elements of the air temperature classifier and its general application in the induction circuits of internal combustion engines.

DESCRIPTION OF THE PREFERRED EMBODIMENT

Figure 1:
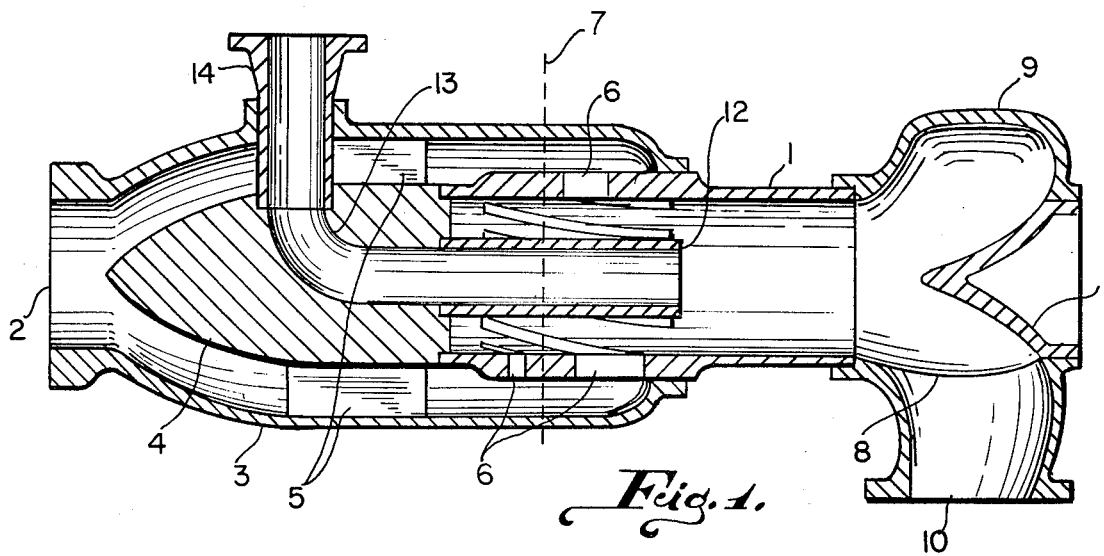
FIG. 1 Is a side view of the air temperature classifier shown in cross-section.

Referring now to the drawings and to FIG. 1 thereof in particular which is a side view of the air temperature classifier drawn in cross-section to show the various interior parts comprising the invention. Air enters the classifier chamber 1 axially through flanged inlet 2, hereinafter called inlet 2. The entering air stream is distributed to the outer periphery of the inlet manifold 3 by inlet contour plug 4. Guide vanes 5 are positioned diagonally on the inlet contour plug 4, hereinafter called plug 4, at about 45° to the flow axis, producing a swirling action within the inlet manifold 3. It would be obvious to those skilled in the art that guide vanes 5 could be a separate component or they could be manufactured as an integral part of plug 4, or manufactured as an integral part of inlet manifold 3 or as an intervening web-structure between the integrally cast plug 4 and inlet manifold 3. Furthermore it would be apparent that the surfaces of guide vanes 5 in contact with the flowing air stream may be planar or curved to continually accelerate the turning and that both such configurations can be contoured to lower the resistance to air flow.

Figure 2:
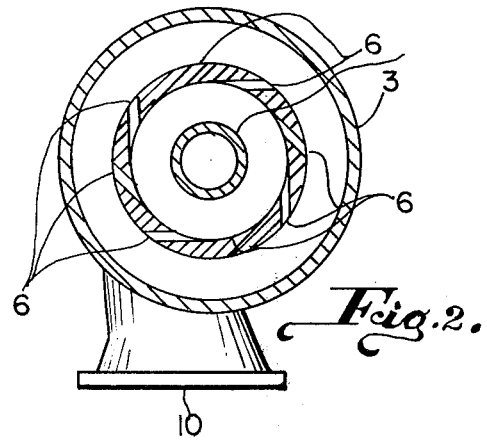
FIG. 2 Is a cross-sectional view of the inlet orifices shown in FIG. 1.

The swirling action in inlet manifold 3 produced by guide vanes 5 increases the velocity head of the air stream in the direction of the inlets of the vortex generating orifices 6, hereinafter called the "inlet orifices 6", which are situated on classifier chamber 1, hereinafter called "chamber 1", in a slanting direction opposite to that of the diagonally positioned guide vanes 5. The inlet orifices 6 penetrate the chamber 1 wall in a manner which introduces the air tangentially to the interior wall surface. A cross-section of the inlet orifice 6 taken at point 7 extending across chamber 1 illustrating the general method of introducing the air tangentially into chamber 1 is shown in FIG. 2. As in the instance of guide vanes 5, it would be obvious that inlet orifices 6 could be formed independently and attached to chamber 1, or they could be alternately formed as an integral part of chamber 1.

Returning now to FIG. 1 and to the description and function of the remaining elements comprising the classifier. The spiraling air flow moving in the axial direction in manifold 3, directs the stream momentum passing through inlet orifices 6 in a more or less axial direction relative to the longitudinal center of chamber 1, giving impetus to the axial movement of the vortex toward exit passages 8. The axial impetus provided is a unique feature of the design which is not found on other vortex generating equipment which depend primarily on pressure differences to promote the axial migration of the vortex toward the chamber exit passages.

Approximately fifty to eighty percent of the air entering inlet orifices 6 pass through outlet passages 8 and enter outlet manifold 9 and exit the classifier through hot air outlet 10 hereinafter called the "hot outlet 10". The air remaining within chamber 1 forms an inner vortex which rotates at the same angular velocity, in the same clockwise directon, but whose axial flow is opposite to that of the outer vortex. Closure 11 closes the hot outlet end of tube 1 and is contoured to function as a flow transition piece which aids in the separation of the inner and outer counterflowing vortices and thereby reduces the amount of random turbulent mixing which in turn decreases the amount of fluid friction beteen the two vortices. The counter flowing inner vortex enters the cold air collection tube 12 passing through manifolding 13 provided in plug 4 and exits the classifier through cold air flanged outlet 14, hereinafter called the "cold outlet 14".

The differential temperature between the hot outlet 10 and the cold outlet 14 is generated by the natural distribution of energy within each of the counter flowing inner and outer vortices in accordance with the law of conservation of momentum which states that a particle moving from the outer periphery to the inner portion of a vortex must accelerate in order to maintain the energy balance present in its relative mass and motion in accordance with Newtons second law. Since the two vortices are locked together at the same angular velocity the particle cannot accelerate and therefore will give up heat in order to satisfy the energy balance. For this reason air particles in the inner vortex are always colder than those located in the periphery of the outer vortex.

Figure 3:
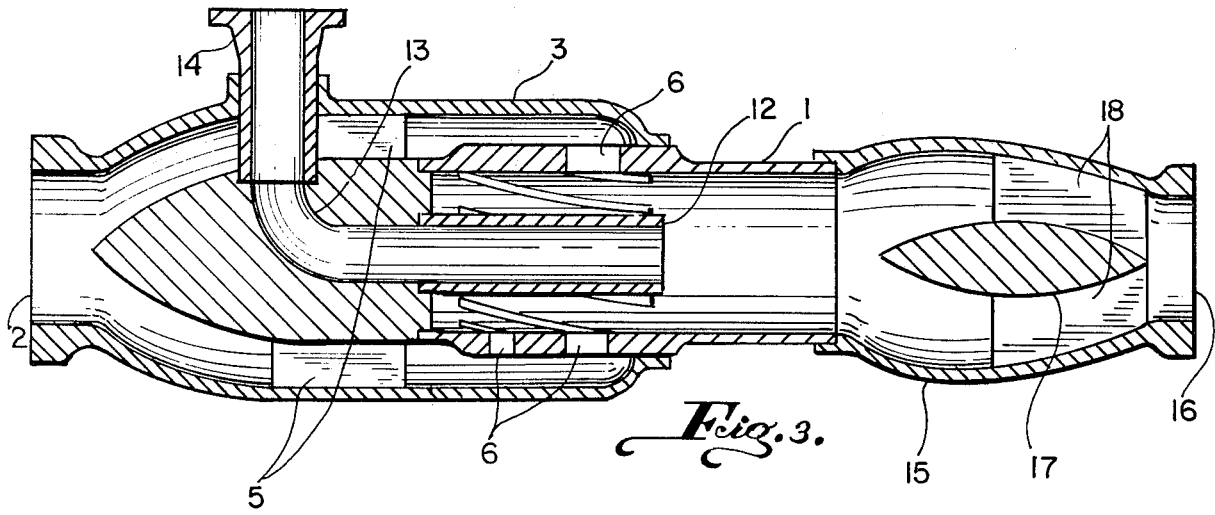
FIG. 3 Is a side view of the air temperature classifier drawn in cross-section showing an alternate method of construction of the hot outlet.

FIG. 3 shows an alternate method of ducting the hot outlet stream from chamber 1 of the classifier. Chamber 1 is fixedly attached to outlet manifold 15 which ducts the outer vortex axially to hot outlet 16. The flow area within outlet manifold 15 is controlled by the transition piece 17 held in place by vane supports 18 which position the transition at an experimentally determined optimum distance from chamber 1.

Figure 4:
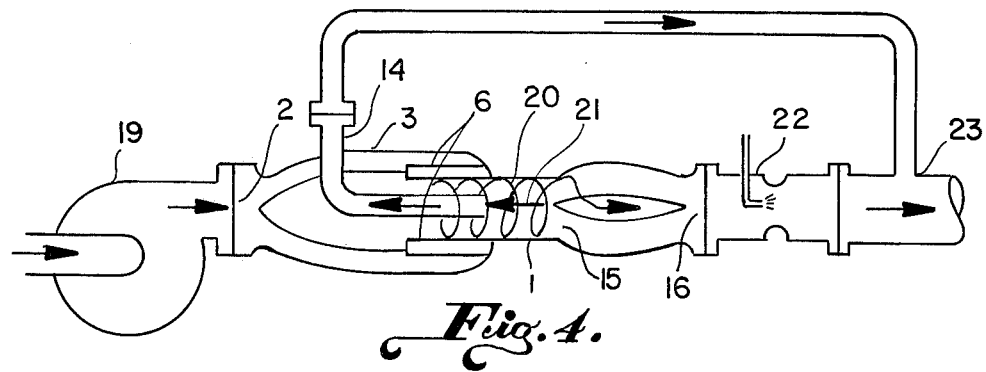
FIG. 4 Is a diagramatic illustration showing the method of attaching the air temperature classifier to a fuel atomizer.

Turning now to FIG. 4 which is a diagramatic illustration showing a method of applying the charge air temperature classifier to the conventional supercharged engine. Blower 19 supplies the compressed air charge in an axial direction to classifier inlet 2. The air passes through inlet manifold 3 and flows tangentially into chamber 1 through inlet orifices 6 forming the outer vortex shown diagrammatically as element 20. Fifty to eighty percent of the air entering chamber 1 through inlet 2 exits at the hot outlet 16 which is ducted toward the fuel atomizer 22 which may be a venturi carburetor of a spray nozzle or an injector. The warm air from hot outlet 16 helps to decrease the size of the fuel droplets formed by the fuel atomizer 22.

The remaining air within chamber 1 forms an inner vortex shown diagrammatically as element 21. The inner vortex 21 exits the classifier at cold outlet 14 and is ducted to a point downstream of the fuel atomizer 22 and is reunited with the flow from the hot outlet from the classifier at a downstream point 23. The combined flow is ducted toward the engine inlet.

Figure 5:
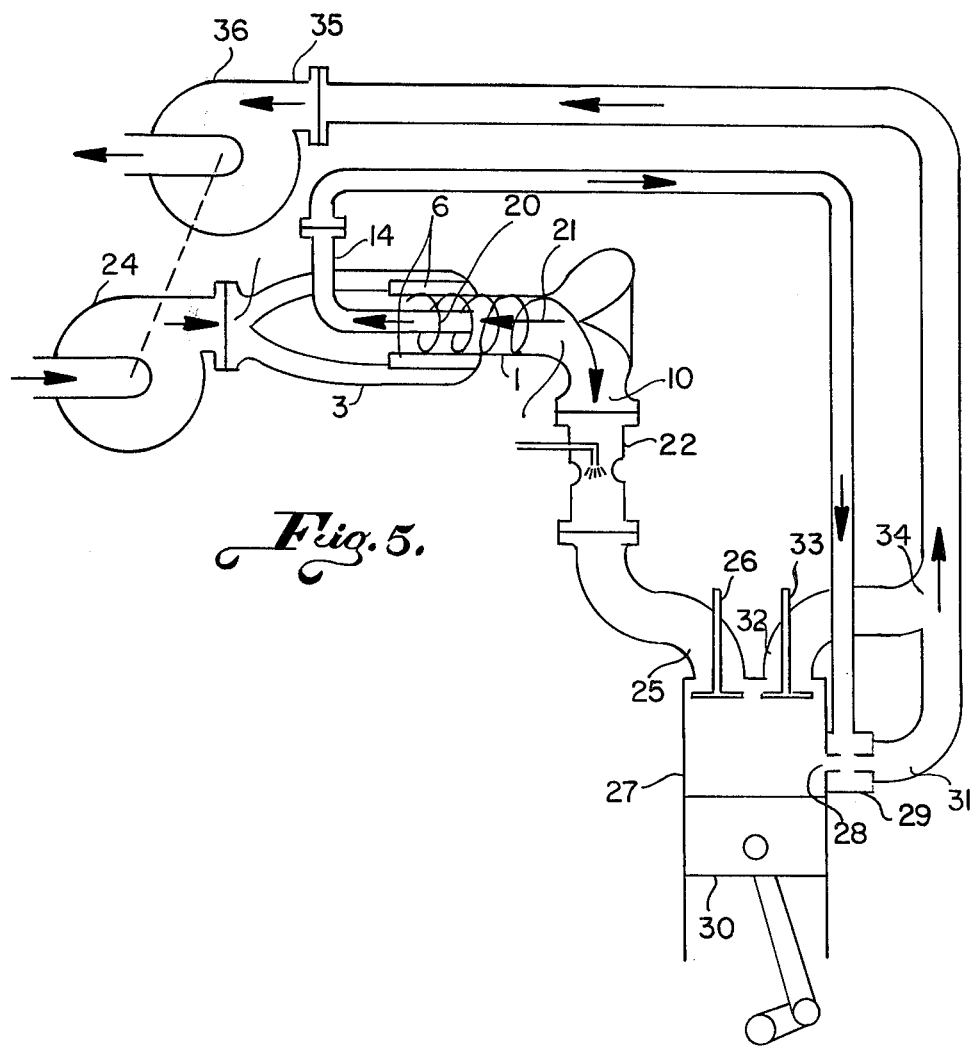
FIG. 5 Is a diagramatic illustration showing a method of connecting the air temperature classifier to an engine.

Turning now to FIG. 5 which shows an alternate method of application of the air temperature classifier in engines which employ cylinder side ports and stratified charging techniques. Charge air from turbo-charger compressor 24 enters classifier inlet 2 and exits at the hot outlet 10 and the cold outlet 14 as previously described. The flow from the hot outlet is directed toward the fuel atomizer 22. The fuel air charge is then ducted toward the engine inlet which is controlled by poppet valve 26. The engine cylinder 27 has a side-port 28 for venting the engine at the bottom of the piston 30 stroke. The cold outlet 14 of the classifier is ducted to an air chamber 29 surrounding sideport 28. When piston 30 uncovers sideport 28 during the power stroke the engine cylinder 27 is brought into communication with air chamber 29 and hot combustion gases flowing from sideport 28 entrain air in air chamber 29 and push these into exhaust duct 31. Hot combustion gases also exit the chamber through exhaust port 32 controlled by poppet value 33 and these gases are then combined to those gases in exhaust duct 31 at point 34. The combined flow from cold outlet 14, exhaust duct 31 and exhaust port 32 are directed toward the inlet 35 of turbine 36 which is used in the conventional arrangement to drive compressor 24.

When piston 30 uncovers sideport 28 during the induction stroke the rarified conditions of cylinder 27 resulting from the pumping action is brought into communication with air chamber 29 and air from cold outlet 14 flowing into air chamber 29 is forced by the pressure generated by compressor 24 into engine cylinder 27 passing over the crown of piston 30 providing additional air to the cylinder which is somewhat stratified below the fuel-air charge entering at the engine inlet 25 controlled by poppet valve 26.

The air chamber 29 and exhaust duct 31 do not constitute elements of the invention and are used only to show the manner of employing the air temperature classifier in those types of cylinder sideport systems referenced as prior art.

While the description of the air temperature classifier is presented in terms of its application to the heating and cooling of components comprising temperature sensitive components of the internal combustion engine its usefulness is not limited to this application alone.

What is claimed is:

1. An air temperature classifier comprising an inlet manifold fixedly attached to one end of a chamber, an inlet fixedly attached to said inlet manifold, said inlet being axially aligned with the longitudinal axis of said inlet manifold and said chamber, a plurality of inlet orifices between said chamber and said inlet manifold, said orifices being positioned in a slantwise direction relative to the longitudinal center of said chamber and directed tangentially to the inner surface of said chamber, a closure fixedly attached at the opposite end of said chamber, an outlet manifold, fixedly attached to said chamber immediately adjacent to the said closure, a hot outlet fixedly attached to said oulet manifold, a collector tube centrally positioned within said chamber, said collector tube beng fixedly attached to manifolding, said manifolding being positioned within a plug, said plug being centrally positioned within said inlet manifold by diagonally placed guide vanes, a cold outlet attached to said manifolding within said plug.

2. The air temperature classifier of claim 1 in which the said hot outlet fixedly attached to said outlet manifold is axially aligned with the longitudinal axes of said outlet manifold and said chamber.

3. The air temperature classifier of claim 1 in which the said hot outlet is ducted to the inlet of a fuel atomizer and the cold air is ducted to the outlet of said fuel atomizer.

4. The air temperature classifier of claim 1 in which the said hot outlet is ducted to the inlet of a fuel atomizer of an engine and the cold outlet is ducted to the cylinder side port of said engine having a plurality of such said cylinder side ports.

5. The air temperature classifier of claim 3 in which the said fuel atomizer is a spray nozzle.

6. The air temperature classifier of claim 3 in which the said fuel atomizer is an injector.

7. The air temperature classifier of claim 3 in which the said fuel atomizer is a carburetor.

8. The air temperature classifier of claim 4 in which the said fuel atomizer is an injector.

9. The air temperature classifier of claim 4 in which the said fuel atomizer is a carburetor.

* * * * *